(No Model.) 2 Sheets—Sheet 1.

J. W. ASKEW.
PLOW CULTIVATOR AND IRRIGATOR.

No. 496,288. Patented Apr. 25, 1893.

Witnesses
J. W. Fowler Jr.
Annie A. Lansdale.

Inventor
Joseph W. Askew.
By John S. Duffie
his Attorney (No Model.) 2 Sheets—Sheet 2.
J. W. ASKEW.
PLOW CULTIVATOR AND IRRIGATOR.

No. 496,288. Patented Apr. 25, 1893.

Witnesses
Inventor
Joseph W. Askew.

United States Patent Office.

JOSEPH W. ASKEW, OF BAILEYVILLE, TEXAS.

PLOW CULTIVATOR AND IRRIGATOR.

SPECIFICATION forming part of Letters Patent No. 496,288, dated April 25, 1893.

Application filed December 5, 1892. Serial No. 454,098. (No model.)

*To all whom it may concern:*

Be it known that I, JOSEPH W. ASKEW, a citizen of the United States, residing at Baileyville, in the county of Milan and State of Texas, have invented certain new and useful Improvements in Plow Cultivators and Irrigators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an underground irrigating plow and consists in the novel construction and arrangement of its parts.

Figure 1:
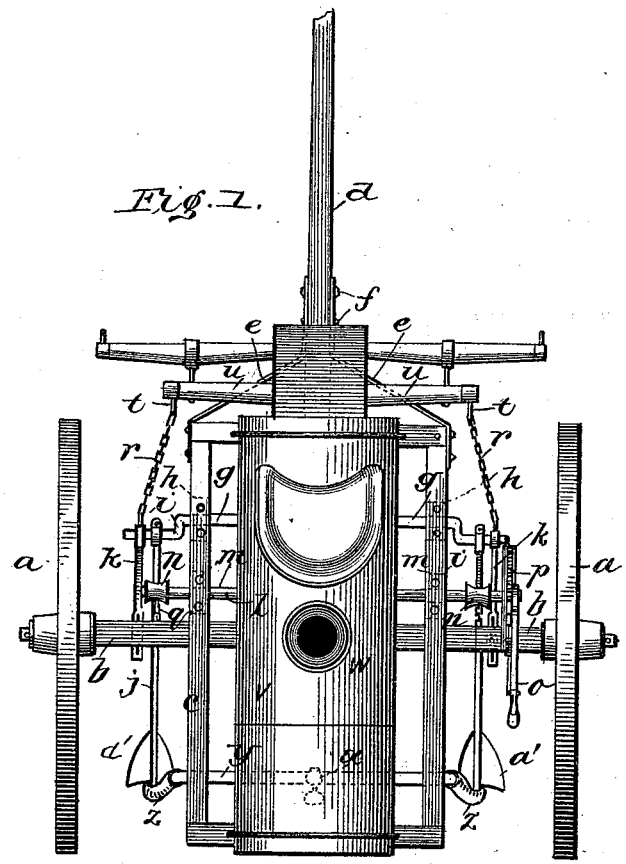
Figure 4:
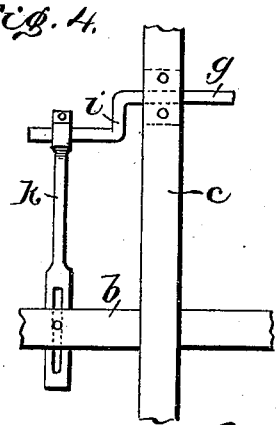
Figure 2:
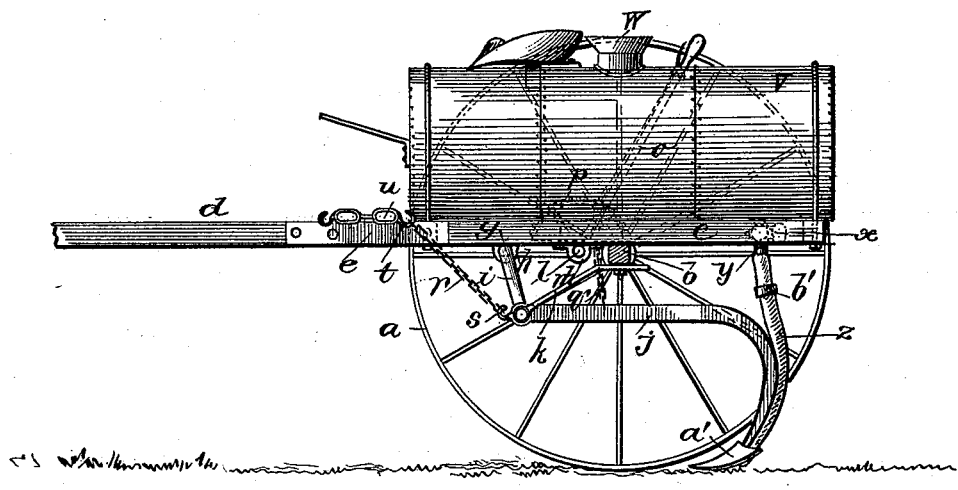
Figure 3:
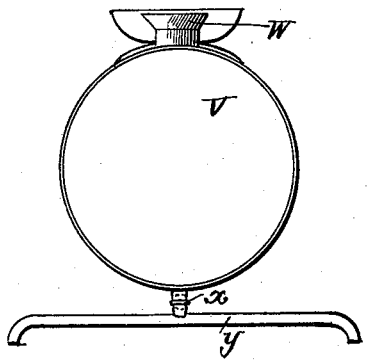

In the accompanying drawings: Figure 1, is a top plan view of my invention. Fig. 2, is a side view of my invention. Figs. 3 and 4, are detail views.

My invention has relation to cultivating and irrigating arid lands, and is described as follows:

In the accompanying drawings $a$, represents the wheels, $b$, the axle and $c$, the frame which is secured to the said axle, $b$, in any suitable manner, the tongue $d$, is fastened to the front end of frame $c$, by means of stay rods $e$, and bolts $f$, the draft bar $g$, is secured to the frame $c$, by means of sleeves $h$, said draft bar $g$, is provided at each end with crank arms $i$, so as to raise or lower the front ends of the plow beams $j$, which are swiveled on said crank arms. The extreme ends of said crank arms are strengthened by braces $k$, the front ends of which are swiveled on said arms, and the rear ends are slotted and secured to said axle by means of proper bolts and nuts. The object of the slots is to make said crank arms $i$, adjustable. A brake rod $l$, is journaled to said frame $c$, by boxes $m$, and carries near each end a chain spool, $n$, which is rigidly secured to said rod, and to one end of said rod $l$, is rigidly secured a ratchet lever $o$, working in a ratchet $p$, which is rigidly secured to axle $b$; to the chain spools, $n$, is secured one end of a chain $q$, the other end being secured to the plow beams, $j$, said arrangement just mentioned is for the purpose of raising and lowering the rear ends of said plow beams and thus regulating the pitch of the plow points and the depth of the furrows. Said crank arms $i$, are further supported by draft chains, $r$, their rear ends being secured to hooks $s$, on the front ends of beams $j$, and their front ends to the hooks $t$, of the double tree $u$. These chains may be hooked up longer or shorter, their links being so constructed that said hooks will pass into them. The water tank $v$, is secured over the said frame $c$, by any suitable means, said tank is provided on its top with a water door, $w$, the water passing out through the water gate, $x$, thence through the pipe $y$, thence into the hoes $z$, said hoes run down in the rear of said beams, $j$, and of the plow points $a'$, the rear and bent ends of said beams are concave so as to receive and protect said hose the flow of the water is regulated by proper stop-cocks said hose conduct the water into the ground, under and just behind the plow points $a'$. The said plow points $a'$, are constructed in such a manner so as to allow the water to be deposited under them in the furrow, and at the same time leave the ground almost level and apparently dry on top and at the same time making their way in the middle, between the rows, so as not to turn out or disturb the roots of the growing crop. Said hose are made adjustable by couplings $b'$, and can be suited to any land. They are pliable and adjust themselves to any ordinary unevenness in the rows.

With my invention I can break or water either one or both sides of the row as preferred.

I deposit the water under the plow in the furrow and leave the top of the ground level and apparently dry by so constructing my beams $j$, as to turn the plow points very much to the front and thus said plow points run under the ground rather than turn it over on the principle of a subsoil. I claim the right to attach handles to the irrigator so as to handle it as walking as well as riding.

Having described my invention, what I claim as new, and desire to secure by Letters Patent, is—

1. In combination with an irrigating plow, substantially as shown and described, the draft bar $g$, provided with crank arms $i$, plow beams $j$, their front ends swiveled on said crank arms; ratchet rod $m$, having chain spools $n$, rigidly secured thereon; ratchet lever $o$, rigidly secured to one end of said rod, and working in the ratchet $p$; chains $q$, having their lower ends secured to said plow-beams and their upper ends to said spools; braces $k$, their front ends swiveled on the crank arms $i$, and their rear ends adjustably secured to the axle $b$, and draft chains $r$, having their rear ends adjustably secured to crank arms $i$, and their front ends to the double-tree $u$, substantially as shown and described and for the purposes set forth.

2. In combination with an irrigating plow, substantially as shown and described, the draft bar $g$, provided with crank arms $i$, plow beams $j$, their front ends swiveled on said crank arms; chains $q$, having their lower ends secured to said plow-beams, and their upper ends to the spools $n$, operated by a suitable ratchet mechanism; braces $k$, their front ends swiveled on the crank arms $i$, and their ends adjustably secured to the axle $b$, and draft chains $r$, having their rear ends adjustably secured to the crank arms $i$, and their front ends to the double-tree $u$, substantially as shown and described and for the purposes set forth.

In testimony whereof I affix my signature in presence of two witnesses.

JOSEPH W. ASKEW.

Witnesses:
W. A. BRADLEY,
J. L. CLAUTON.